US005399027A

United States Patent [19]

Ijuin et al.

[11] Patent Number: 5,399,027

[45] Date of Patent: Mar. 21, 1995

[54] ROLLING BEARING FOR A HIGH SPEED ROTATION

[75] Inventors: Seiji Ijuin; Yoshio Shoda, both of Kanagawa, Japan

[73] Assignee: NSK Ltd., Tokyo, Japan

[21] Appl. No.: 266,267

[22] Filed: Jun. 27, 1994

[30] Foreign Application Priority Data

Jun. 25, 1993 [JP] Japan .................................. 5-177568

[51] Int. Cl.⁶ ................................................ F16C 33/66

[52] U.S. Cl. ........................................ 384/475; 384/448

[58] Field of Search ............... 384/474, 475, 448, 507, 384/513

[56] References Cited

U.S. PATENT DOCUMENTS 2,217,801 10/1940 Katcher ............................... 384/475
3,195,965 7/1965 Van Dorn ........................... 384/475
4,108,506 8/1978 Osborn .
4,334,720 6/1982 Signer ................................ 384/475
4,797,014 1/1989 Nicolich ......................... 384/475 X
4,798,299 1/1989 Bayer et al. .................... 384/448 X

FOREIGN PATENT DOCUMENTS 1334454 10/1973 United Kingdom .

*Primary Examiner*—Thomas R. Hannon
*Attorney, Agent, or Firm*—Sughrue, Mion, Zinn, Macpeak & Seas

[57] ABSTRACT

A rolling bearing for supporting a rotating shaft of a high speed rotating machine is provided with an outer race including an outer raceway on an inner face thereof, an inner race including an inner raceway on an outer face thereof, the inner race being rotated together with the rotating shaft, a plurality of rolling elements rotatably disposed between the outer raceway and the inner raceway, and a hole formed at a portion of the inner race, in which a section of the hole in a circumferential direction of the inner race has a shape of which a size in the circumferential direction of the inner race is greater than that in an axial direction of the inner race, and which are free from a sharp edge. The rolling bearing can relax stress concentration produced in the inner race during a high speed rotation and can increase the allowable rotation speed of the inner race.

14 Claims, 5 Drawing Sheets

ROLLING BEARING FOR A HIGH SPEED ROTATION

BACKGROUND OF THE INVENTION

The present invention relates to a rolling bearing for supporting a rotating shaft of a high speed rotating machine such as a gas turbine, or a jet engine.

Conventionally, in order to support a rotating shaft, rolling bearings such as a ball bearing shown in FIG. 8, and a roller bearing shown in FIG. 11 are widely used. The ball bearing shown in FIG. 8 provides an outer race 2 having an outer raceway 1 on the inner face, an inner race 4 having an inner raceway 3 on the outer face, and a plurality of balls 5 (rolling elements) which are rotatably disposed between the outer and inner raceways 1 and 3. The balls 5 are held by a cage 6 with being arranged at regular spaces in the circumferential direction.

In the ball bearing shown in FIG. 8, the inner race 4 is of the two-piece type. Specifically, the inner race 4 has a configuration in which paired left and right half pieces *7a* and *7b* having an annular shape are laterally joined to each other. The inner raceway 3 are formed at the joint portion of the two half pieces *7a* and *7b*. Since the balls 5 contacts with the inner raceway 3 at an angle of contact which is indicated by a chain line i, however, the rolling contact surface of the balls 5 do not contact with the joint face of the two half pieces *7a* and *7b*.

In the half piece *7a* which is the one (the left one in FIG. 8) of the half pieces *7a* and *7b*, a groove 8, and an oil hole 9 are formed as shown in FIGS. 9 and 10. The groove 8 is formed in an inner end edge of the half piece *7a*. When the half piece *7a* is combined with the other half piece *7b*, the groove 8 constitutes an oil path which opens on the center portion of the inner raceway 3. The oil hole 9 opens on a portion which is in an outer face of an end portion of the half piece *7a* in the axial direction (the lateral direction in FIG. 8), and which is separated from the inner raceway 3. Moreover, also the other half piece *7b* is provided with an oil hole 10 which opens on a portion which is in an outer face of an end portion of the other half piece *7b* in the axial direction, and which is separated from the inner raceway 3.

When a high speed rotating machine into which such a rolling bearing is incorporated is operated, lubricating oil is supplied from a rotating shaft supported on the inner side of the inner race 4, into the groove 8 and the oil holes 9 and 10. As a result, contact portions between the balls 5 and the outer and inner raceways 1 and 3, and sliding contact portions between the outer face of the inner race 4 and the inner face of the cage 6 are lubricated.

The roller bearing shown in FIG. 11 provides an outer race **2*a* having an outer raceway 1*a* on the inner face, an inner race 4*a* having an inner raceway 3*a* on the outer face, and a plurality of rollers 11 (rolling elements) which are rotatably disposed between the outer and inner raceways 1*a* and 3*a*. The rollers 11 are held by a cage 6*a*** with being arranged at regular spaces in the circumferential direction.

In the roller bearing, oil holes **9*a* and 10*a* are formed at the both end portions of the inner race 4*a* in the axial direction, respectively, so that lubricating oil can be supplied to contact portions between the rollers 11 and the outer and inner raceways 1*a* and 3*a*, and sliding contact portions between the outer face of the inner race 4*a* and the inner face of the cage 6*a***.

However, rolling bearings such as a ball bearing, and a roller baring having the configurations described above have the following problem to be solved. When the inner race 4 or **4*a* is rotated at a high speed together with a rotating shaft of a high speed rotating machine into which such a rolling bearing is incorporated, a tensile force in the circumferential direction and due to a centrifugal force is applied to the inner race 4 or 4*a***.

This tensile force causes stresses to concentrate on the oil holes 9 and **9*a* or 10 and 10*a* formed in the inner race 4 or 4*a*. In such a conventional rolling bearing, all the oil holes 9 and 9*a* or 10 and 10*a* have a circular section shape, and therefore the degree of stress concentration is very high. When the inner race 4 or 4*a* is rotated at a high speed for a long period, there arises a possibility that a defect such as a crack is produced. Conventionally, therefore, the rotation speed of the inner race 4 or 4*a* is limited to a level at which such a defect is not produced. With respect to the groove 8 formed in the ball bearing shown in FIGS. 8 to 10, such stress concentration is hardly produced. However, the oil supply path formed by the groove 8** cannot be located at a portion other than the joint face of the half pieces *7a* and *7b*, resulting in that the oil supply path formed by the groove 8 fails to substitute for the oil holes 9 and **9*a* or 10 and 10*a***

In the above, stress concentration due to the section shape of the oil holes 9 and **9*a* or 10 and 10*a* through which lubricating oil passes has been described. Such stress concentration is produced also at holes other than the oil holes. In some cases, in order to measure the temperature of the inner race 4 during an operation process, recess holes 14 are formed in the inner race 4 as shown in FIG. 12, and temperature sensors are disposed in the recess holes 14, respectively. In a conventional rolling bearing, such recess holes 14** also have a circular section shape in the same manner as oil holes, and therefore such stress concentration is produced.

SUMMARY OF THE INVENTION

The present invention has been accomplished to eliminate the difficulties accompanying a conventional rolling bearing. An object of the present invention is to provide a rolling bearing which can relax stress concentration produced in an inner race during a high speed rotation and which can increase the allowable rotation speed of the inner race.

This object of the present invention can be attained by a rolling bearing providing an outer race having an outer raceway on an inner face, an inner race having an inner raceway on an outer face, a plurality of rolling elements which are rotatably disposed between the outer raceway and the inner raceway, and a hole formed at a portion of the inner race, in which a section of the hole in the circumferential direction of the inner race has a size in a circumferential direction of the inner race which is greater than that in an axial direction of the inner race, and which is free from a sharp edge.

With the rolling bearing of the present invention which is configured as described above, even when the inner race is rotated at a high speed, stress concentration is hardly produced at oil holes. As a result, a defect such as a crack is hardly produced, and hence the inner race is allowed to be rotated at a higher speed.

DETAILED DESCRIPTION OF THE INVENTION

There will be described hereinbelow embodiments of a rolling bearing according to the present invention with reference to the accompanying drawings.

Figure 1:
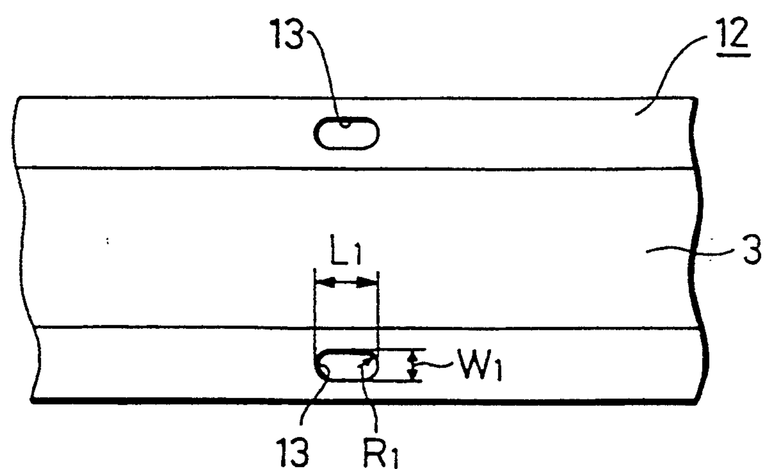
FIG. 1 is a partial plan view of an inner race and showing a first embodiment of the present invention.
Figure 2:
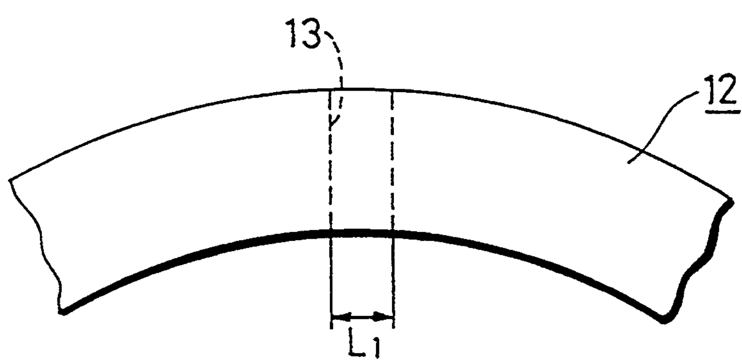
FIG. 2 is a view of the inner race of FIG. 1 as seen from below.

FIGS. 1 and 2 show a first embodiment of the present invention. The rolling bearing of the present invention is characterized in the section shape of oil holes 13 formed in an inner race 12, and the configurations and functions of the other portions are the same as those of conventional rolling bearings. Therefore, the illustration and description of the portions other than the inner race 12 are omitted, and only characteristic portions of the present invention are described hereinbelow.

Oil holes 13 are formed by an electric discharge machining process or the like at both end portions (upper and lower end portions in FIG. 1) of the inner race 12 in the axial direction, respectively, where the end portions are separated from an inner raceway 3. The oil holes 13 elongated in a radial direction of the inner race 12. Each of the oil holes 13 has an oval section shape of which two semicircular portions respectively disposed at ends of the oil hole 13 are connected to each other by linear portions. The longitudinal direction of each oil hole 13 coincides with the circumferential direction of the inner race 12.

When the curvature radius of each of the semicircular portions is indicated by $R_1$ and the length of each of the oil holes 13 by $L_1$, $L_1$ is set to be longer than $R_1$ by a factor of 2.4 to 9 ($L_1=(2.4 \text{ to } 9)\times R_1$) so that $L_1$ is 1.2 to 4.5 times as long as the width $W_1(=2R_1)$. When the section shape of each oil hole 13 is restricted as described above, stress concentration produced at the oil holes 13 is reduced in level to about 90 to 60% of that produced in the case where oil holes are formed as circular holes of a radius of $R_1$.

Figure 8:
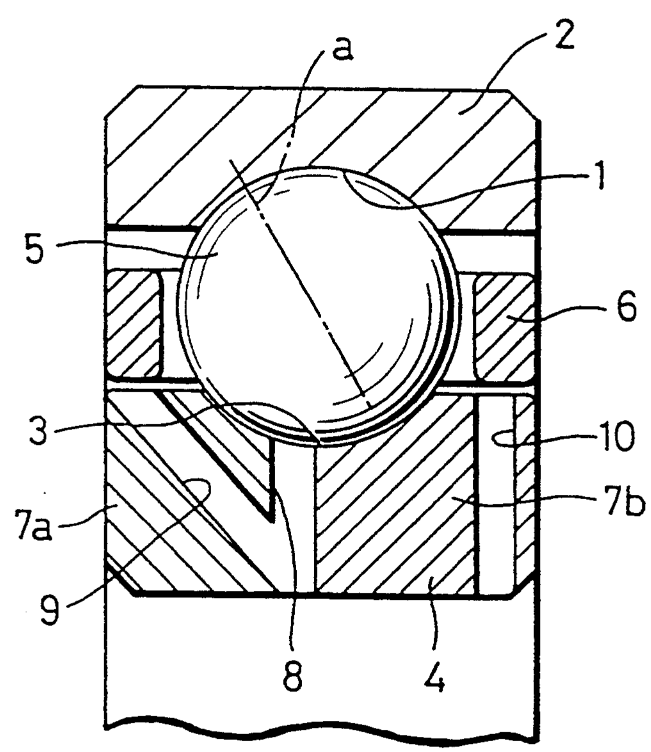
FIG. 8 is a partially sectional view showing a first example of a rolling bearing to which the present invention can be applied.
Figure 9:
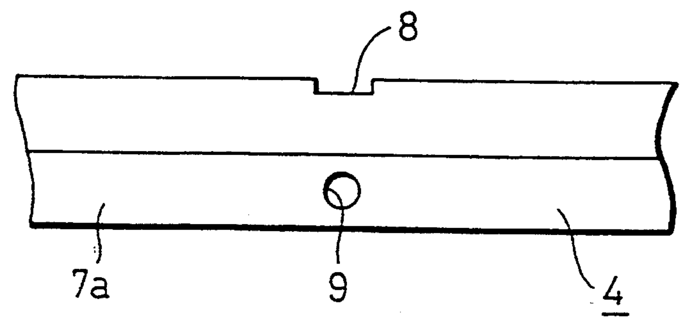
FIG. 9 is a plan view showing one half piece constituting an inner race which is to be incorporated into the rolling bearing of the first example.
Figure 10:
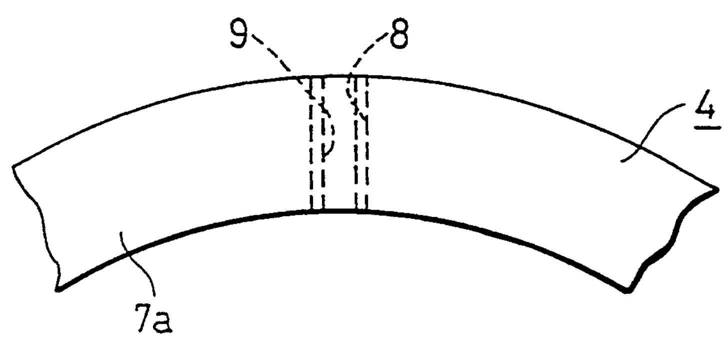
FIG. 10 is a view of the half piece of FIG. 9 as seen from below.
Figure 11:
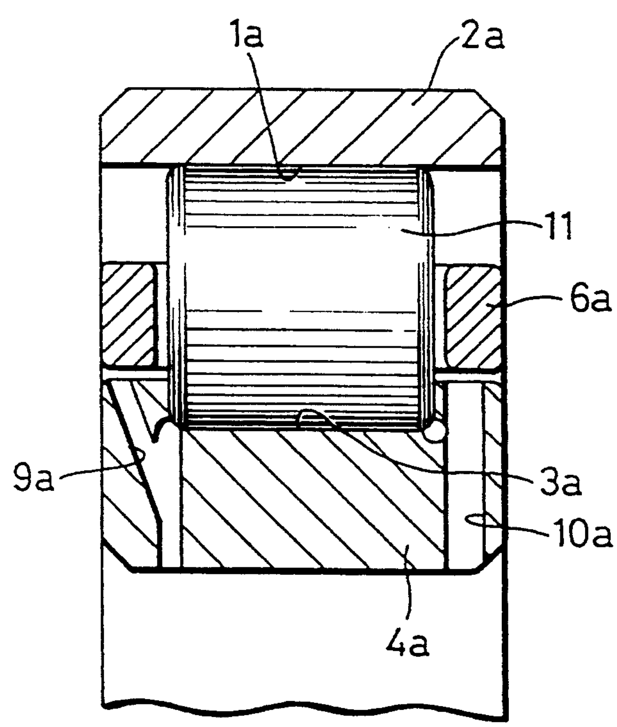
FIG. 11 is a partially sectional view showing a second example of a rolling bearing to which the present invention can be applied.

The inner race 12 in which the oil holes 13 are formed as described above are combined with an outer race, and rolling elements to constitute a rolling bearing such as that shown in FIG. 8 or 11. While rotatably supporting a rotating shaft fitted into the inner race 12 with supplying lubricating oil through the oil holes 13, the thus the rolling bearing of the present invention functions in the same manner as the prior art rolling bearings described above.

Particularly, according to the rolling bearing of the present invention, stress concentration produced in the oil holes 13 when the inner race 12 is rotated at a high speed is relaxed by 10 to 40% as described above. Therefore, a defect such as a crack is hardly produced in the oil holes 13. As a result, the inner race 12 can be rotated at a higher speed, whereby the performance of a machine into which the rolling bearing is incorporated can be improved.

Figure 3:
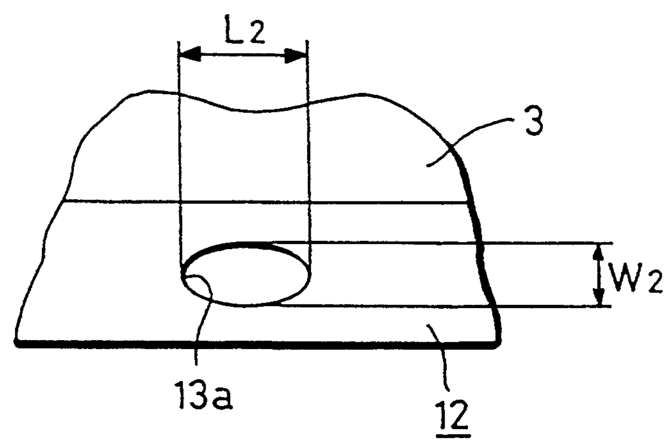
FIG. 3 is a partial plan view of an inner race and showing a second embodiment of the present invention.

FIG. 3 shows a second embodiment of the present invention. In the embodiment, an oil hole 13*a* formed at an end portion of an inner race 12 has an elliptical section shape, and the major axis of the ellipse is directed into the circumferential direction of the inner race 12.

In the embodiment, when the length (major axis of the ellipse) and the width (minor axis of the ellipse) of the oil hole 13*a* are respectively indicated by $L_2$ and $W_2$, the ratio of $W_2$ to $L_2$ is set so as not to be greater than 0.9 or $W_2/L_2 \leqq 0.9$. The restriction of the length and width enables stress concentration produced at the oil holes 13*a* to be reduced in level to 90% or less of that produced in the case where an oil hole is formed as a circular hole of a radius of $W_2/2$. Accordingly, the inner race 12 can be rotated at a speed which is increased by a degree corresponding to the reduced level of stress concentration.

Figure 4:
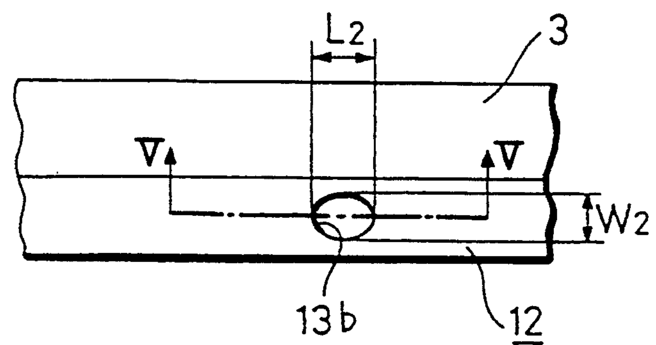
FIG. 4 is a partial plan view of an inner race and showing a third embodiment of the present invention.
Figure 5:
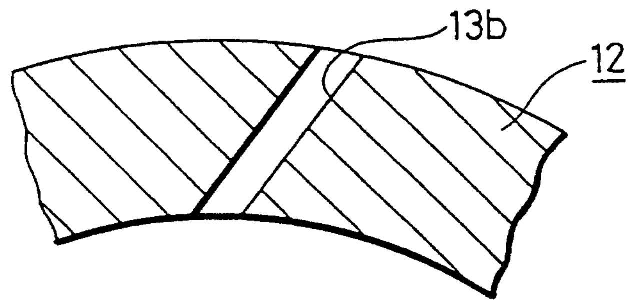
FIG. 5 is a sectional view taken along a line V—V in FIG. 4.

FIGS. 4 and 5 show a third embodiment of the present invention. In the embodiment, an oil hole 13*b* having a circular section shape is inclined to a radial direction of an inner race 12. Therefore, the section of the oil hole 13*b* in the circumferential direction of the inner race 12 has an elliptical section shape in the same manner as the second embodiment described above. The other configurations including the length and width of the ellipse, and function of the third embodiment are the same as those of the second embodiment.

Figure 6:
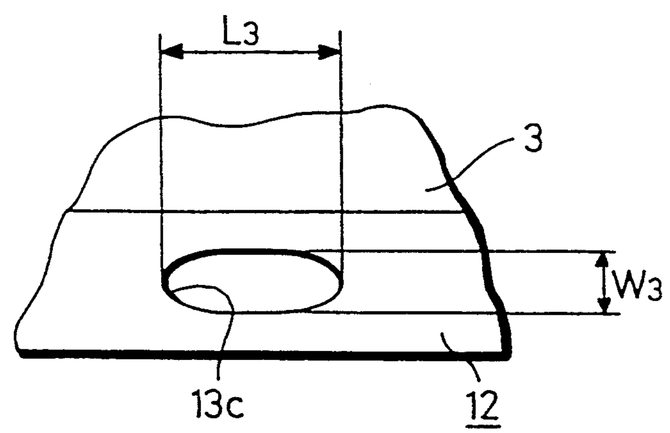
FIG. 6 is a partial plan view of an inner race and showing a fourth embodiment of the present invention.

FIG. 6 shows a fourth embodiment of the present invention. In the embodiment, an oil hole 13*c* has a substantially elliptical section shape of which two semielliptic portions respectively disposed at ends of the hole are connected to each other by linear portions. When the length and width of the oil hole 13*c* are respectively indicated by $L_3$ and $W_3$, $L_3$ and $W_3$ are restricted so that $L_3$ is set to be longer than $W_3$ by a factor of 1.2 to 4.5 ($L_3=(1.2 \text{ to } 4.5)\times W_3$). When the section shape of the oil hole 13*c* is restricted as described above, stress concentration produced at the oil hole 13*c* is reduced in level to about 90 to 60% of that produced in the case where an oil hole is formed as a circular hole of a radius of $W_3/2$. Accordingly, the inner race 12 can be rotated at a speed which is increased by a degree corresponding to the reduced level of stress concentration.

Figure 7:
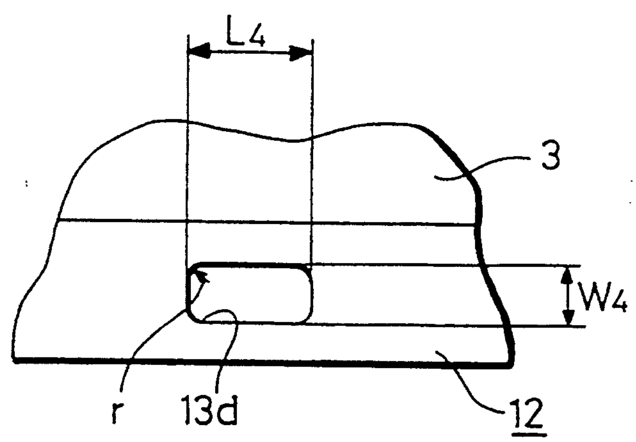
FIG. 7 is a partial plan view of an inner race and showing a fifth embodiment of the present invention.

FIG. 7 shows a fifth embodiment of the present invention. In the embodiment, an oil hole 13*d* has a substantially rectangular shape which is elongated in the circumferential direction of an inner race 12. The four corners of the rectangle are formed as arcs of a curvature radius of r. When the length and width of the oil hole 13*d* are respectively indicated by $L_4$ and $W_4$, r, $L_4$ and $W_4$ are restricted so that $2r \geqq 0.3W_4$ and $L_4 \geqq 1.2W_4$. When the section shape of the oil hole **13*d* is restricted as described above, stress concentration produced at the oil hole 13*d* is reduced in level to about 90 to 60% of that produced in the case where an oil hole is formed as a circular hole of a radius of $W_4/2$. Accordingly, the inner race 12** can be rotated at a speed which is increased by a degree corresponding to the reduced level of stress concentration.

Figure 12:
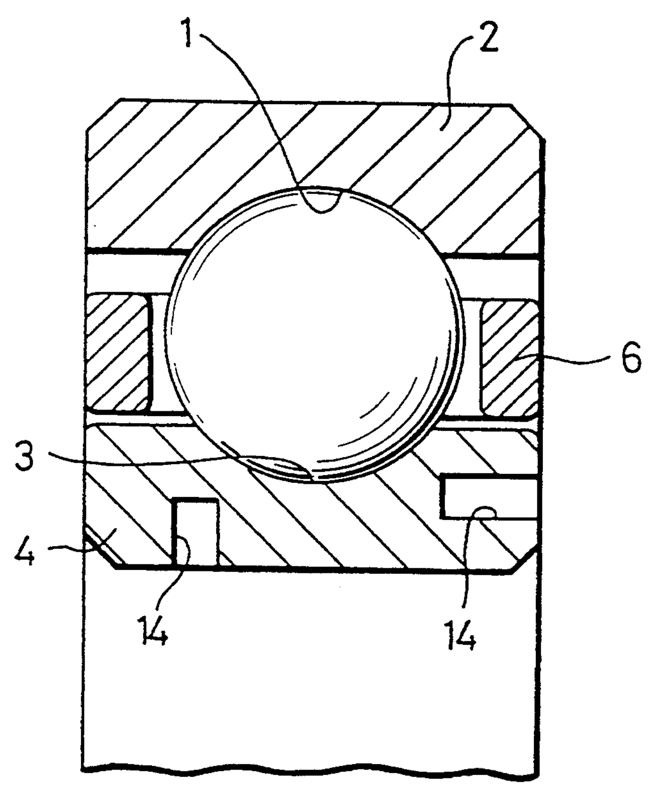
FIG. 12 is a partially sectional view showing a third example.

In the above, the embodiments in which the present invention is applied to an oil hole for supplying lubricating oil have been described. The present invention can be applied to the recess holes 14 for a temperature sensor which have been described in conjunction with FIG. 12, and also applied to the recess holes 14 for the other sensors in order to measure conditions of the rolling bearing during the operation. When the recess holes 14 are formed so as to have an oval, elliptical, substantially long elliptical, or long rectangular section shape in the same manner as the above-described embodiments, stress concentration produced at the recess holes 14 when the inner race 4 is rotated at a high speed can be relaxed.

The rolling bearing of the present invention is configured and functions as described above. Consequently, stress concentration produced in an inner race during a high speed rotation can be relaxed, and therefore the allowable rotation speed of the inner race can be increased, whereby a machine into which the rolling bearing is incorporated can be improved in performance.

What is claimed is:

1. A rolling bearing for supporting a rotating shaft of a high speed rotating machine, comprising:

an outer race including an outer raceway on an inner face thereof;

an inner race including an inner raceway on an outer face thereof, said inner race being rotated together with the rotating shaft;

a plurality of rolling elements rotatably disposed between said outer raceway and said inner raceway; and a hole formed at a portion of said inner race, wherein a section of said hole in a circumferential direction of said inner race has a shape of which a size in the circumferential direction of said inner race is greater than that in an axial direction of said inner race, and which is free from sharp edges.

2. The rolling bearing of claim 1, wherein said hole is formed at an end portion of said inner race in the axial direction where the end portion is separated from said inner raceway.

3. The rolling bearing of claim 1, wherein said hole has an oval section shape of which two semicircular portions respectively disposed at ends of said hole are connected to each other by linear portions so that a longitudinal direction of said hole coincides with the circumferential direction of said inner race.

4. The rolling bearing of claim 3, wherein the longitudinal length of said hole is 2.4 to 9 times as long as the curvature radius of each of the semicircular portions.

5. The rolling bearing of claim 1, wherein said hole has an elliptical section shape so that a long major axis of an ellipse is directed into the circumferential direction of said inner race.

6. The rolling bearing of claim 5, wherein the width of a short minor axis of the ellipse is not more than 0.9 times as long as the length of the long major axis of the ellipse.

7. The rolling bearing of claim 1, wherein said hole having a circular section shape is inclined to a radial direction of said inner race so that the section of said hole in the circumferential direction of said inner race has an elliptical section shape and a long major axis of an ellipse is directed into the circumferential direction of said inner race.

8. The rolling bearing of claim 7, wherein the width of a short minor axis of the ellipse is not more than 0.9 times as long as the length of the long major axis of the ellipse.

9. The rolling bearing of claim 1, wherein said hole has a substantially elliptical section shape of which two semielliptic portions respectively disposed at ends of said hole are connected to each other by linear portions so that a longitudinal direction of said hole coincides with the circumferential direction of said inner race.

10. The rolling bearing of claim 9, wherein the longitudinal length of said hole is 1.2 to 4.5 times as long as the width of a short minor axis of each of the semielliptic portions.

11. The rolling bearing of claim 1, wherein said hole has a substantially rectangular shape elongating in the circumferential direction of said inner race so that four corners of a rectangle are formed as arcs.

12. The rolling bearing of claim 11, wherein the twice length of each curvature radius of arcs forming the corners is not less than 0.3 times as long as the width of said hole in the axial direction of said inner race and the longitudinal length of said hole is not less than 1.2 times as long as the width of said hole.

13. The rolling bearing of claim 1, wherein a lubricating oil is supplied from an inner face of, said inner race through said hole.

14. The rolling bearing of claim 1, wherein said hole comprises a recess hole for disposing a temperature sensor therein.

* * * * *